Dec. 17, 1940.                H. CARUSO                2,225,255
                          SOLDERING APPARATUS
                         Filed Oct. 14, 1939          2 Sheets-Sheet 1
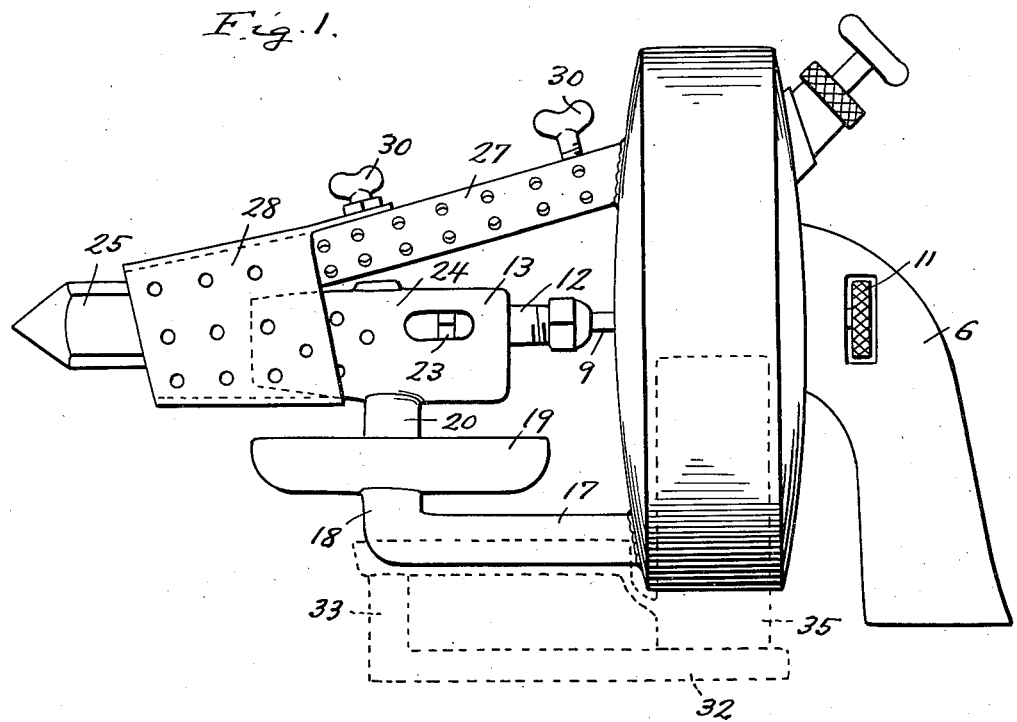
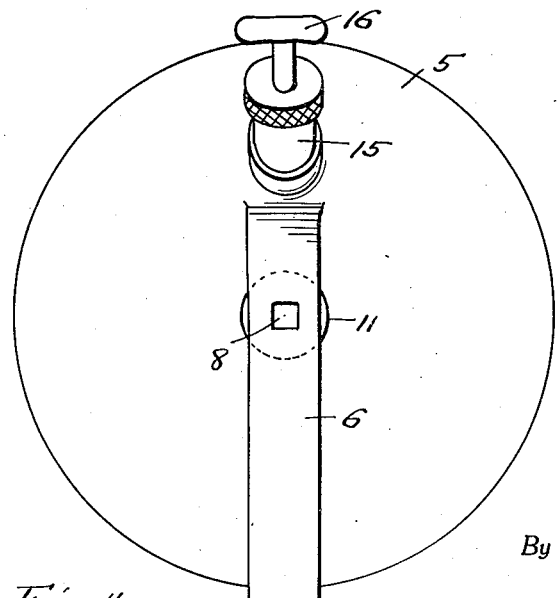
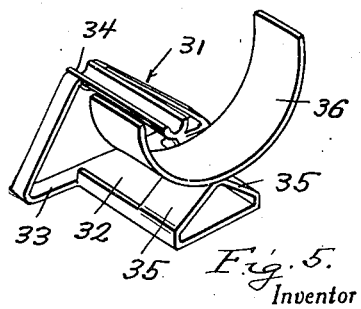
Inventor
Harry Caruso
By Clarence A. O'Brien
and Hyman Berman
Attorneys Dec. 17, 1940.   H. CARUSO   2,225,255
SOLDERING APPARATUS
Filed Oct. 14, 1939   2 Sheets-Sheet 2
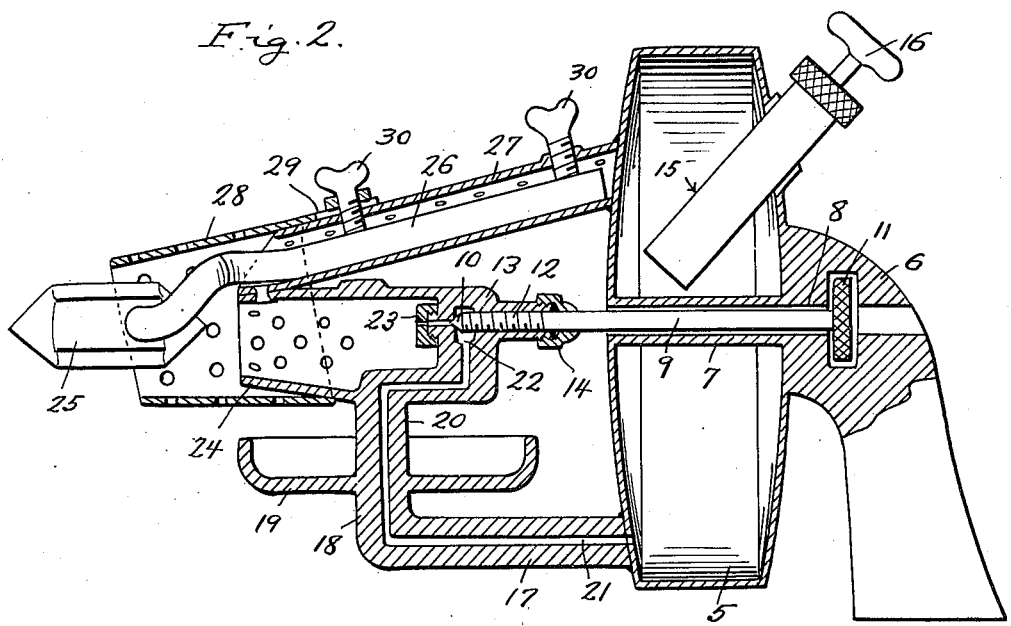
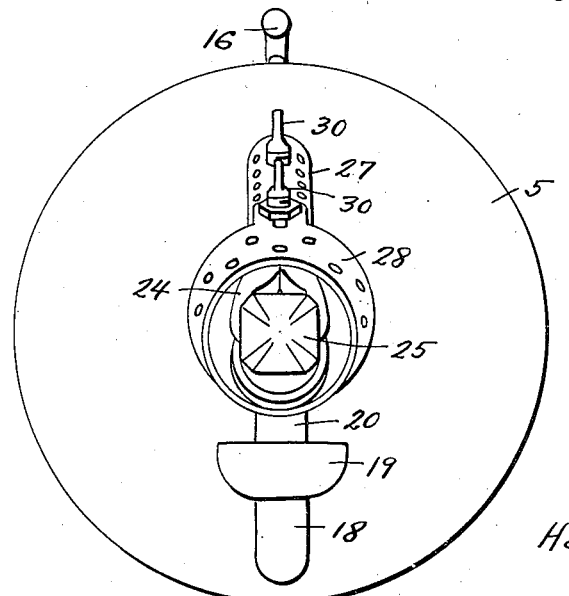
Inventor
Harry Caruso
By Clarence A. O'Brien
and Hyman Berman
Attorneys Patented Dec. 17, 1940

2,225,255

UNITED STATES PATENT OFFICE 2,225,255

SOLDERING APPARATUS

Harry Caruso, Oswego, N. Y.

Application October 14, 1939, Serial No. 299,557

3 Claims. (Cl. 158—27)

This invention appertains to new and useful improvements in soldering devices and more particularly to a soldering device of a portable nature.

A principal object of the present invention is to provide a soldering device having a pistol grip to the end that the soldering device can be handled in a convenient and practical manner.

Another important object of the invention is to provide a liquid fuel heated soldering iron which is entirely self-contained and capable of being adjusted to the proper requirements.

These and various other important objects and advantages of the invention will become apparent to the reader of the following specification.

In the drawings:

Figure 1 represents a side elevational view of the device.

Figure 2 is a longitudinal sectional view.

Figure 3 is a front elevational view.

Figure 4 is a rear elevational view.

Figure 5 represents a perspective view of the stand.

Referring to the drawings wherein like numerals designate like parts it can be seen that numeral 5 represents a cylindrical drum having the pistol grip 6 extending rearwardly and downwardly from the central portion thereof. Extending axially through the drum 5 is the tube 7 which is aligned with the bore 8 in the upper portion of the pistol grip 6 and through this bore 8 and tube 7 is disposed the needle valve stem 9 having the tapered forward end 10. The rear end of the stem 9 is provided with the knurled head 11 for facilitating the rotation of the stem 9. This stem 9 is provided with the threaded portion 12 threadedly disposed into the fitting 13, the stem 9 passing through the packing gland 14.

A pump structure generally referred to by numeral 15 extends into the upper portion of the fuel containing drum 5 and has the plunger 16 whereby air can be pumped into the drum 5, to keep the liquid contents of the drum 5 under pressure.

Extending forwardly from the lower portion of the liquid fuel containing drum 5 is the conduit 17 which has the upwardly disposed forward portion 18 on which is the drip-catching pan 19. The conduit has the upwardly extending portion 20 on which the fitting 13 is mounted. Through the conduits 17, 18, 20 is the passageway 21 which extends from the drum 5 to the chamber 22 in the fitting 13. A port in the fitting 13 can be closed by the needle valve 10 and is in communication with the spray nozzle or burner tip 23. Numeral 24 represents a perforated shell extending forwardly from the fitting 13 and through which the flame from the burner tip 23 can sweep to reach the iron, which is preferably of copper and denoted by numeral 25. This iron is tapered in the usual way and has the shank 26 extending therefrom. This shank extends into the barrel 27 which is perforated for the purpose of ventilation. Numeral 28 represents a flame shield or cuff which encompasses the inner end portion of the iron 25 and the outer portion of the shell 24 and this has an ear 29 slotted to accommodate the winged screw 30, the latter being driven into the tube 27, and against an intermediate portion of the shank 26. Another screw 30 is driven through the tube 27, and against the inner end of the shank 26, these screws 30 serving to positively hold the iron in proper adjusted relation with respect to the burner tip 23. Obviously, the amount of fuel supplied to the burner tip can be controlled by the knurled head 11 and stem 9.

A stand such as is generally referred to by numeral 31 and shown in Figure 5 consists of the plate 32 having the latterly and upwardly bent arms 33, converged inwardly to attach to the trough-like structure 34, the latter being horizontally disposed. Additional uprights, inwardly converging members 35—35 support the stirrup 36 and also the remaining end of the trough 34. The iron can be placed on the stand by disposing the fuel containing drum 5 in the stirrup 36 and the conduit 17 in the trough 34.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A soldering apparatus comprising a drum having a pump extending therefrom arranged to compress air in the drum, an axially disposed tube extending through the drum, a handle protruding from one end of the drum and having a bore extending therethrough aligned with the tube, said handle having an opening therein intersecting the bore, a needle valve extending through the tube and to the opening, a knob in the opening for rotating the needle valve, a conduit extending from the drum and having an upwardly disposed forward portion, said upwardly disposed portion having a valve shell, a valve seat in the valve shell against which the needle valve is operative, a perforated shell extending forwardly from the valve shell, a jet extending from the valve shell in the perforated shell, a soldering iron and means carried by the drum for supporting the soldering iron in front of the perforated shell, said means on the drum for supporting the soldering iron comprising an elongated tube rigidly secured to the drum and provided with a perforated cuff at the forward end thereof into which the perforated shell projects, said iron having an elongated shank extending into the tube, and a set screw feedable through the tube and against the shank to hold the soldering iron in proper spaced relation with respect to the perforated shell.

2. A soldering apparatus comprising a drum having a pump extending therefrom arranged to compress air in the drum, an axially disposed tube extending through the drum, a handle protruding from one end of the drum and having a bore extending therethrough aligned with the tube, said handle having an opening therein intersecting the bore, a needle valve extending through the tube and to the opening, a knob in the opening for rotating the needle valve, a conduit extending from the drum and having an upwardly disposed forward portion, said upwardly disposed portion having a valve shell, a valve seat in the valve shell against which the needle valve is operative, a perforated shell extending forwardly from the valve shell, a jet extending from the valve shell in the perforated shell, a soldering iron and means carried by the drum for supporting the soldering iron in front of the perforated shell, said means on the drum for supporting the soldering iron comprising an elongated tube rigidly secured to the drum and provided with a perforated cuff at the forward end thereof into which the perforated shell projects, said iron having an elongated shank extending into the tube, and a set screw feedable through the tube and against the shank to hold the soldering iron in proper spaced relation with respect to the perforated shell, said cuff being provided with a perforated ear and being detachable from the tube, said set screw being disposable through the ear and tube to engage against the shank.

3. In a soldering apparatus, a perforated shield, a valve shell extending into the perforated shield, a soldering iron, means supporting the soldering iron in front of the perforated shield with a portion projecting into the shield, an elongated tube, a supporting structure to which the valve shell and tube are secured, said iron having an elongated shank extending into the tube, and a set screw feedable through the tube and against the shank to hold the soldering iron in proper spaced relation with respect to the perforated shield, said shield being secured to the outer end of the tube.

HARRY CARUSO.